Patented Oct. 9, 1923.

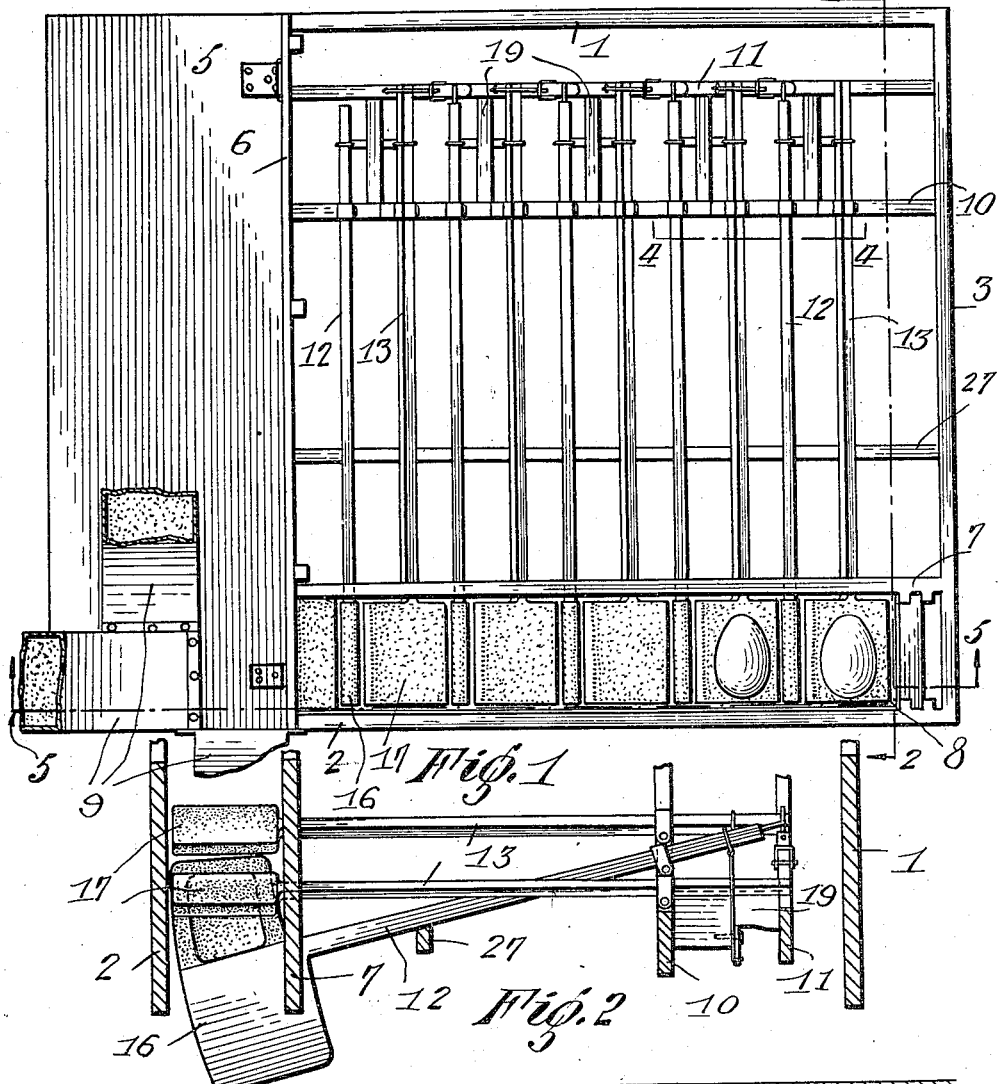

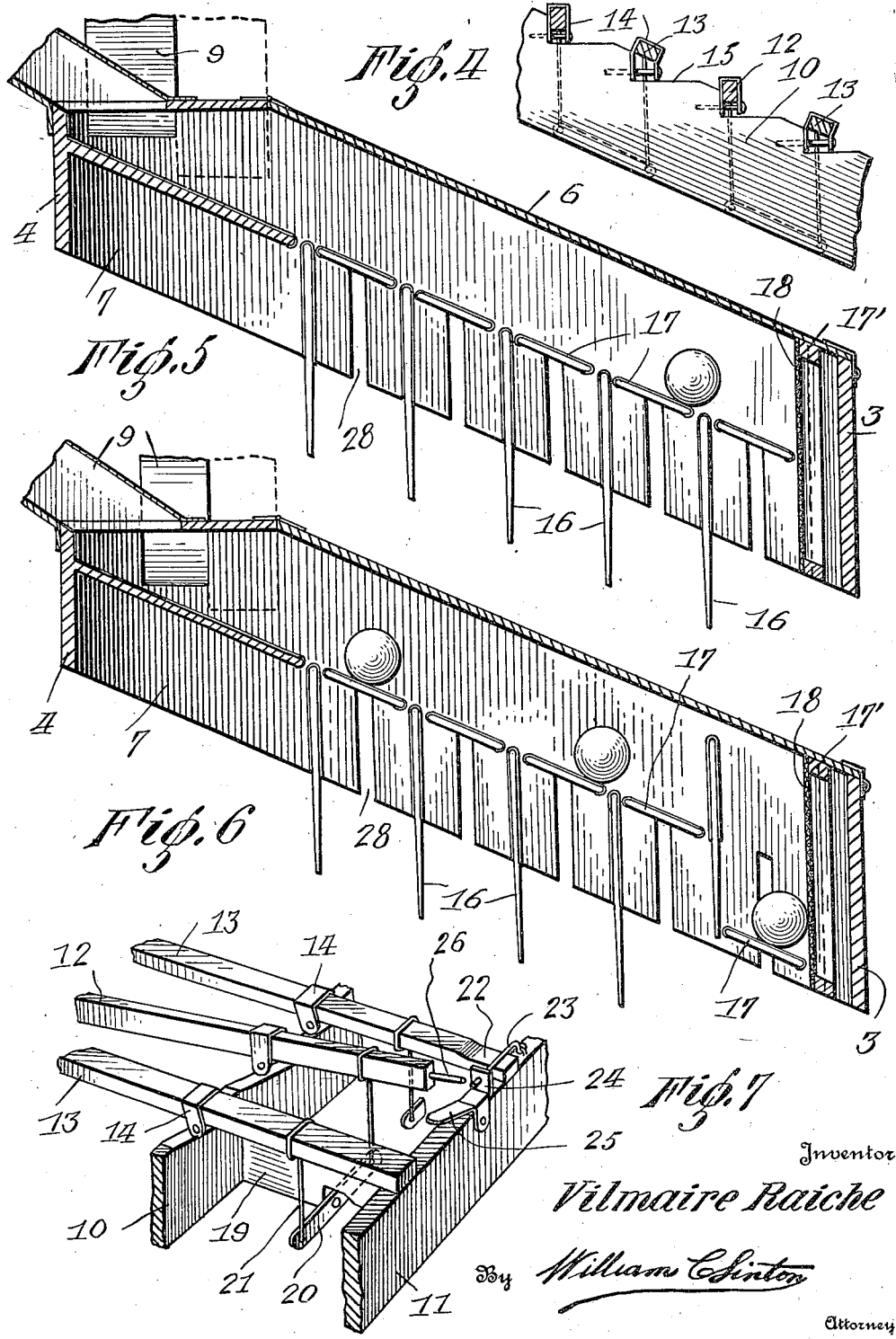

1,470,103

UNITED STATES PATENT OFFICE.

VILMAIRE RAÎCHE, OF ST. FELIX DE KINGSEY, QUEBEC, CANADA.

NEST ATTACHMENT.

Application filed August 14, 1922. Serial No. 581,759.

*To all whom it may concern:*

Be it known that I, VILMAIRE RAÎCHE, a subject of the King of Great Britain, residing at St. Felix de Kingsey, Province of Quebec, Canada, have invented certain new and useful Improvements in Nest Attachments; and I do hereby declare that the following is a full, clear, and exact description of the invention, such as will enable others skilled in the art to which it appertains to make and use the same.

It is well known among poultry raisers that there is a tendency among hens at various times to break the eggs which they have laid. The present invention relates to a device whereby this difficulty is overcome by means of a mechanism for delivering the egg from the nest immediately as it is laid.

The invention consists essentially in a chute through which the egg passes and in which a plurality of eggs may be stored.

The invention is fully disclosed in the following description and in the accompanying drawings in which:

Figure 1 is a plan view of the device with the cover removed;

Figure 2 is a section on the line 2—2 of Figure 1;

Figure 3 is a similar view in another position;

Figure 4 is a section on the line 4—4 of Figure 1;

Figure 5 is a section on the line 5—5 of Figure 1;

Figure 6 is a similar view showing an egg lodged in the chute; and,

Figure 7 is a detail perspective view of the latch and operating mechanism.

Referring to the various views by corresponding reference characters throughout, there is provided a substantially rectangular frame having side walls 1, 2 and front and rear walls 3, 4 respectively. A fragmentary top 5 is secured to the rear wall and has hinged thereto an inclined cover 6 adapted to rest on the front wall. Adjacent the side wall 2 and in spaced relation therefrom is provided a partition 7 in substantial parallel relation with the wall. The space 8 thus formed is in the nature of a chute and is placed in communication with a plurality of auxiliary chutes 9 which pass through the cover piece 5. A fulcrum bar 10 extends longitudinally of the frame, while a rest bar 11 lies in the space between the wall 1 and bar 10, being parallel with both of these latter members.

A plurality of levers or rocker arms 12, 13 are fulcrumed on the bar 10 by means of pivoted yokes 14 which are secured to the step portions 15 of this bar. The inner ends of the bars 12, 13 are alternately and respectively provided with partition members 16 and depressor plates 17. These members are disposed within the space 8 and are covered with felt, carpeting, or the like, in order that the eggs coming into engagement therewith will not be broken. The opposite ends of these rods 12, 13 are adapted to rest on the bar 11, as is evident from Figure 7. At the forward end of the chute is inserted a frame 17' which carries a screen or padding 18 forming the lower wall of the chute.

A bearing block 19 is fixed intermediate each pair of bars 12 and 13 and is supported between the bars 10 and 11. To each of said blocks is pivoted a rocker arm or lever 20 the opposite ends of which are connected to the bars 12, 13 by means of the links 21. With the exception of the lowermost bar 13, each such bar has a reduced end 22 which is adapted to be locked against the rest bar 11 by means of a latch 23 pivoted thereto. The free end of the latch is adapted for insertion in a keeper 24, also pivoted to the bar 11, and provided with a trip 25. This trip is in the path of a pin 26 inserted in the corresponding end of each bar 12.

The operation of the device is as follows: when the first egg enters the chute or space 8, it naturally rolls to the lowermost depressor plate 16. Because of the weight of the egg, the plate is lowered at one end, as shown in Figure 6, while the opposite end rises carrying with it an end of the rocker 20. Consequently the lowermost bar 12 (Figure 7) is lowered and the pin 26 engages the trip 25, whereby the latch 23 is released. As the rod 12 is thus actuated, the partition 16 at the other end thereof is raised to the position shown in Figure 6, forming a stop for the next egg. The second lowermost bar 13, now being unlocked, will be depressed at one end as the next egg arrives thereon, while the opposite end, through the medium of the corresponding lever 20, will raise the next partition in the manner already described.

Between the partition 7 and bar 10 there is fixed a stop bar 27 for limiting the downward movement of the bars 12, 13. The resultant vertical movement is accommodated in the slots 28 formed in the partition 7.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. An egg delivery apparatus comprising a frame, a main chute formed therein and longitudinally thereof, pivoted bars extending transversely of the frame and extending into said chute, the portions disposed in said chute being provided alternately with depressor plates and partitions.

2. An egg delivery apparatus comprising a frame, a main chute formed therein and longitudinally thereof, pivoted bars extending transversely of the frame and extending into said chute, the portions disposed in said chute being provided alternately with depressor plates and partitions, and means for raising said partitions upon depression of the plates.

3. An egg delivery apparatus comprising a frame, having a main chute formed therein and extending longitudinally thereof, pivoted bars disposed transversely of the frame and extending into said chute, the portions within the chute being alternately provided with depressor plates and partitions, means for locking said depressor plates in raised position, and means associated with the rods carrying the partitions for releasing said plates.

4. An egg delivery apparatus comprising a frame, a main chute formed therein and extending longitudinally thereof, pivoted bars disposed transversely of the frame and extending into said chute, the portions within the chute being provided alternately with partitions and depressor plates, rocker arms pivoted in said frame and having their opposite ends connected respectively to a plate carrying bar and a partition carrying bar, means for locking said plate carrying bars in raised position, and means carried by the other bars for releasing the plate carrying bars.

5. An egg delivery apparatus comprising a frame, a main chute formed therein and extending longitudinally thereof, a pair of pivoted bars disposed transversely of the frame and having their ends disposed within said chute, said ends being provided with a depressor plate and a partition respectively, a rest bar in said frame and adapted to support the free ends of the pivoted bars, means for locking the plate carrying bars to the rest bar, and means provided on the partition carrying bars for releasing the plate carrying bars.

6. An egg delivery apparatus comprising a frame, a main chute formed therein and extending longitudinally thereof, a pair of pivoted bars disposed transversely of the frame and having their ends disposed within said chute, said ends being provided with a depressor plate and a partition respectively, a rest bar in said frame and adapted to support the free ends of the pivoted bars, a latch adapted to extend across the end of the plate carrying bar, a keeper pivoted to said rest bar and adapted to engage the free end of the latch, said keeper being provided with a trip, and means associated with the end of the partition carrying bar for actuating the trip and releasing the latch.

In witness whereof I have hereunto set my hand.

VILMAIRE RAÎCHE.